United States Patent [19]
Sachdev et al.
[11] Patent Number: 4,525,722
[45] Date of Patent: Jun. 25, 1985

[54] CHEMICAL HEAT AMPLIFICATION IN THERMAL TRANSFER PRINTING

[75] Inventors: Krishna G. Sachdev; Harbans S. Sachdev, both of Wappingers Falls; Ari Aviram, Yorktown Heights; Mark A. Wizner, Beacon, all of N.Y.

[73] Assignee: International Business Machines Corporation, Armonk, N.Y.

[21] Appl. No.: 582,694

[22] Filed: Feb. 23, 1984

[51] Int. Cl.$^{3}$ ........................ B41J 31/02; G01D 15/10

[52] U.S. Cl. .................................... 346/1.1; 346/76 L; 346/76 PH; 400/118; 400/120; 400/241.1; 428/913; 428/914; 430/945

[58] Field of Search .............. 346/76 L, 76 PH, 76 R, 346/135.1, 1.1; 400/120, 118, 237, 241.1; 430/945, 348; 428/913, 914

[56] References Cited

U.S. PATENT DOCUMENTS 3,615,533 10/1971 Rauner ............................ 430/348 X
3,787,210 1/1974 Roberts ........................... 430/945 X
4,491,432 1/1985 Aviram ............................ 400/241.1

OTHER PUBLICATIONS

Bruce et al.; Exothermic Laser Transfer Printing; IBM Tech. Disc. Bulletin, vol. 18, No. 12, May 1976, p. 4142.

*Primary Examiner*—Joseph W. Hartary
*Attorney, Agent, or Firm*—Jackson E. Stanland

[57] ABSTRACT

Chemical heat amplification is provided in thermal transfer printing, wherein some of the heat necessary for melting and transferring ink from a solid fusible layer in a ribbon to a receiving medium is provided by an exothermic reaction. This chemical reaction is due to an exothermic material that is located in the ink layer, or in another layer of the ink bearing ribbon. The exothermic reaction reduces the amount of the input power which must be applied either electrically or with electromagnetic waves. Examples of suitable exothermic materials are those which will provide heat within the operative temperature range of the ink, and specifically hydrazone derivatives which are substantially colorless, and have a molecular weight in the approximate range 150–650.

22 Claims, 8 Drawing Figures

FIG. 1.1
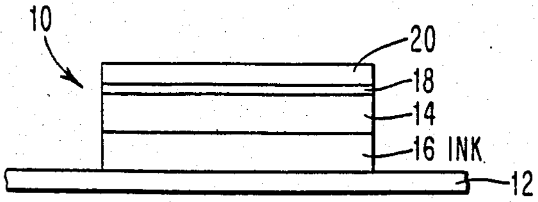
FIG. 1.2
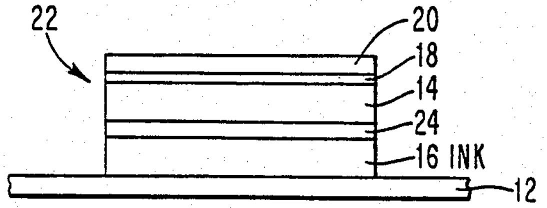
FIG. 2
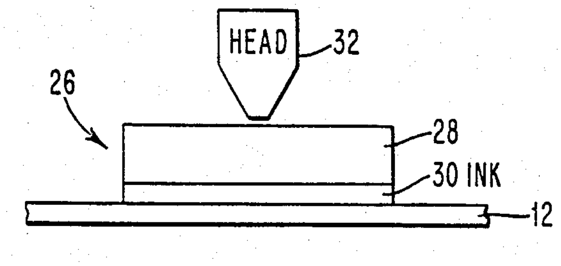
FIG. 3
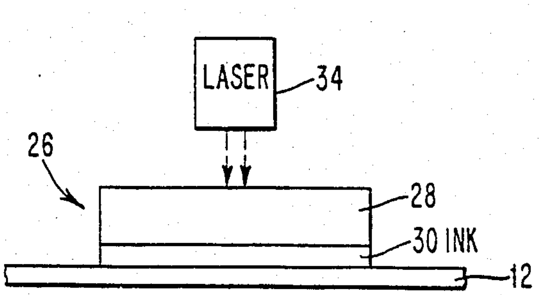

CHEMICAL HEAT AMPLIFICATION IN THERMAL TRANSFER PRINTING

DESCRIPTION

1. Technical Field

This invention relates to thermal transfer printing and more particularly to an improved technique and apparatus for providing heat amplification to effect thermal transfer of ink, where the heat amplification is chemically provided through the use of hydrazone derivatives.

2. Cross Reference to a Related Application

Copending application Ser. No. 454,814 (Aviram et al), now Pat. No. 4,491,432 filed Dec. 30, 1982, and assigned to the present assignee, describes the first known technique for heat amplification in thermal transfer printing using chemical means.

3. Background Art

Thermal transfer printing is one type of non-impact printing which is becoming increasingly popular as a technique for producing high quality printed materials. Applications exist in providing low volume printing such as that used in computer terminals and typewriters. In this type of printing, ink is printed on the face of a receiving material (such as paper) whenever a fusible ink layer is brought into contact with the receiving surface, and is softened by a source of thermal energy. The thermal energy causes the ink to locally melt and transfer to the receiving surface.

The thermal energy is supplied from either an electrical source or an optical source, such as a laser. When electrical sources are used, a thermal head can provide the heat to melt the ink layer. An example of a thermal head is one which consists of tantalum nitride thin film resistor elements, as described in Tokunaga, et al, IEEE Trans. on Electron Devices, Vol. ED-27, No. 1, January 1980. Laser printing is known in which light from laser arrays is used to provide heat for melting and transferring the ink to a receiving medium. However, this type of printing is not very popular because lasers providing sufficient power are very expensive.

Another type of thermal transfer printing is one in which a resistive ribbon is provided containing a layer of fusible ink that is brought into contact with the receiving surface. The ribbon also includes a layer of resistive material which is brought into contact with an electrical power supply and selectively contacted by a thin printing stylus at those points opposite the receiving surface where it is desired to cause printing. When current is applied, it travels through the resistive layer and provides local resistive heating in order to melt a small volume of the fusible ink layer, which then transfers to the receiving medium. This type of printing is exemplified by U.S. Pat. No. 3,744,611. An electrothermal printhead for use in combination with a resistive ribbon is shown in IBM Technical Disclosure Bulletin, Vol. 23, No. 9, February 1981, p. 4305.

In resistive ribbon thermal transfer printing, it is often the situation that the substrate contact to the head becomes unduly heated and debris accumulate on the printhead. This increases the contact resistance and develops heat in the printhead. To overcome the accumulation of debris and the increase in contact resistance, the amplitude of the applied current has to be increased. This can produce fumes and ruin the substrate.

Printing power has to be elevated when printing at higher speeds is attempted. For instance, while printing at 4"/sec requires currents of 22 mA and 8 volts, printing at 8"/sec may require 35 mA at the same voltage level. Some ribbon substrates may not be durable enough to print at 35 mA and in such cases printing speed can not be increased unless some other means are provided to lower the printing energy requirements.

A technique for reducing the amount of power required within a printhead in a resistive ribbon thermal transfer process is described in IBM Technical Disclosure Bulletin, Vol. 23, No. 9, February 1981, at page 4302. In this approach, a bias current is provided through a roller into the resistive layer located in the printing ribbon. This means that not all of the energy required to melt the ink has to be supplied through the printhead.

Another approach possibly providing some amplification of heat is that described in IBM Technical Disclosure Bulletin, Vol. 20, No. 2, July 1977, at page 808. In this reference, a photoconductive layer is located between two electrodes, across which is attached a power supply. When light strikes the photoconductor, it will be conductive in the region where it is hit by the light , and will close the circuit between the two electrodes. This provides a current flow, where the current is a source of heat that develops in the photoconductor and is transferred to an adjacent ink layer. The ink layer is locally melted so that it can be transferred to a receiving medium.

In thermal transfer printing, it is known that the ink transfer efficiency and print quality depend upon the pressure, the thickness of the ink layer and the base, and the smoothness of the ink layer on the paper surfaces. These factors affect transfer efficiency and print quality for the same heating power and heat duration.

In aforementioned copending application Ser. No. 454,814 (Aviram et al), a technique was described for alleviating some of the power requirements in thermal transfer printing. That technique can be used in printers in which a thermal head (including laser print heads) is used to provide heat, and in printers in which resistive ribbons are used. Rather than using mechanical or electrical techniques for reducing the amount of power that is required for printing, that invention provided chemical heat amplification in any type of thermal transfer printing. That result was accomplished by using an exothermic material which undergoes a unimolecular exothermic decomposition and is located close to, or in the ink layer. Application of a heat pulse or a current pulse in the printhead is merely a trigger to cause the exothermic material to locally produce heat, which aids in melting and/or transferring the ink.

While the invention of copending application Ser. No. 454,814 provided an important step in alleviating some of the power requirements in thermal transfer printing, it did present some possible problems in the choice of the materials used for the chemical heat amplification. For example, the exothermic reaction should occur at the proper temperature and should have a sufficient magnitude to provide enough heat amplification. Typically, the temperature at which the exothermic reaction occurs should be greater than about 100° C. and less than about 200° C. In copending application Ser. No. 454,814, the heat per unit weight contributed by the chemical additive is fairly small and the temperatures at which the exothermic reaction occurs are relatively high (for example, approximately 220°-225° C.). Although such additives can be used to advantage, they are not the most practical in a system which must provide high resolution printing.

In addition to the comments of the previous paragraph, it is noted that some of the chemical additives of that prior copending application tend to be rather shock sensitive, i.e., they tend to be sensitive to handling and may explode when subjected to shocks. This is because their stability is not high.

Another possible problem with some of the chemical additives of copending application Ser. No. 454,814 is that they may produce volatile byproducts which are toxic, during the thermal transfer of ink.

For example, some of the chemical additives are made from DMF, which is a toxic material. If one of the by-products of the exothermal reaction is DMF, toxic fumes will result.

Still another potential problem with some of the chemical additives of copending application Ser. No. 454,814, concerns their color. The azo compound materials typically have a yellowish color. When used in a printing process to provide chemical heat amplification, they tend to transfer somewhat to the receiving medium and leave a yellowish haze (halo) around the characters that are printed. Thus, they are not really suitable for good, high resolution printing. Another drawback with these prior disclosed additives is that their shelf life is not long, and is typically about a few days in the ink formulation.

Accordingly, it is a primary object of the present invention to provide a new class of exothermic materials which can be used to provide chemical heat amplification to effect thermal transfer of ink, where this new class of materials is thermal and light stable, does not produce toxic by-products during printing, and is substantially colorless.

It is another object of the present invention to provide an improved technique for reducing the amount of power required for thermal transfer printing.

It is another object of the present invention to provide thermal transfer printing of any kind in which clearer print images are provided with the same input power as would be used in printing applications without the improvement of the present invention.

It is another object of this invention to provide improved thermal transfer printing in which debris that accumulates in the printhead is reduced by reducing the magnitude of the required print current.

It is a further object of this invention to provide an improved technique for chemical heat amplification in thermal transfer printing in order to reduce the contact time between the printhead or print stylus and the ink containing ribbon or layer.

It is a still further object of this invention to provide a technique for prolonging printhead life and for reducing the presence of fumes in thermal printing, using an improved technique for chemical heat amplification during the printing operation.

It is another object of this invention to provide an inexpensive way to reduce power requirements in all types of thermal transfer printing, wherein improved chemical amplification of heat is provided.

It is another object of this invention to improve laser printing techniques in a manner to make them more economically feasible, and in particular it is an object to provide improved chemical amplification of heat during the printing process.

It is another object of this invention to reduce power requirements in thermal transfer printing, in an improved manner which does not produce adverse or toxic fumes.

It is another object of the present invention to utilize the chemical amplification of heat concept presented in copending application Ser. No. 454,814, but in a manner which makes that concept more practical for use in high resolution thermal transfer printing.

DISCLOSURE OF INVENTION

Improved chemical heat amplification is provided in all types of thermal transfer printing using selected exothermic materials which undergo an exothermic reaction during the printing process. The exothermic material is located close to, or in the ink layer. Application of a heat or current pulse is a trigger to cause the exothermic reaction to locally produce heat, which aids in melting and/or transferring the ink. This reduces the amount of power which must be applied in order to print.

The new materials used to provide an exothermic reaction during thermal transfer printing are hydrazone derivatives and are characterized by the presence of a hydrazone moiety as an essential structural feature. Aryl sulfonyl hydrazones and related materials are examples. These materials undergo thermally induced chemical changes between 150°-180° celcius, accompanied by exothermicity of the order of 0.4-0.5 kjoules/-gram. A representative structure for the monofunction and difunctional aryl sulfonyl hydrazones is given by the following general formula:

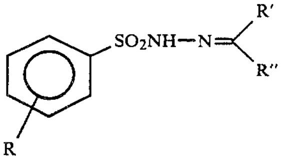

R = $CH_3$, $C_2H_5$, $NO_2$, Cl, OAr, etc.
R' = Alkyl, Aryl, Phenyl

R'' = Alkyl, Phenyl, Aryl, $-C(=O)-Ar$, $-C(=O)-Ph$, etc.

These materials are chemically inert and are thus potentially compatible with a wide variety of ink compositions. Groups R, R', and R'' can be varied to modulate the solubility and the temperature at which their exothermic transformations will occur. In addition to these materials, carbonyl analogues can also be used, such as p-toluene carbonyl hydrazide.

These materials are present in the ink in an amount typically 5-20%, by weight, of the total ink solids. These additives are very light-stable, have long shelf lives, and are inert under ordinary conditions. They are very compatible with solvent-based inks. Although they are typically insoluble in water-based inks, they can be used with water-based inks if the combination is not too highly basic, i.e. a pH less than approximately 9.

These chemical additives undergo highly exothermic thermal decomposition to reactive intermediates which are permanently immobilized by interaction with ink ingredients during transfer. This substantially prevents escape of any volatile products. Also, the reactive species undergo rapid energy dissipation and stabilization by a variety of modes to deliver a large quantity of heat in a small amount of time.

These and other objects, features, and advantages will be apparent from the following more particular description of the preferred embodiments.

BRIEF DESCRIPTION OF THE DRAWINGS

FIG. 1.1 schematically illustrates a suitable ribbon for the practice of this invention in which the exothermic material is present in the ink layer.

FIG. 1.2 is a schematic illustration of a ribbon in which the exothermic material is present in another layer on the ribbon.

FIG. 2 illustrates another ribbon of the type used in resistive ribbon ink transfer, which does not include a conductive layer, where the exothermic material can be present in the ink layer, in the base or support layer, or in a separate layer.

FIG. 3 shows another type of printing ribbon which does not have a resistive layer, and is the type used with thermal or laser printheads. The exothermic material can be an additive to the ink layer or support layer, or can be in a separate layer of this ribbon.

BEST MODE FOR CARRYING OUT THE INVENTION

Figure 4:
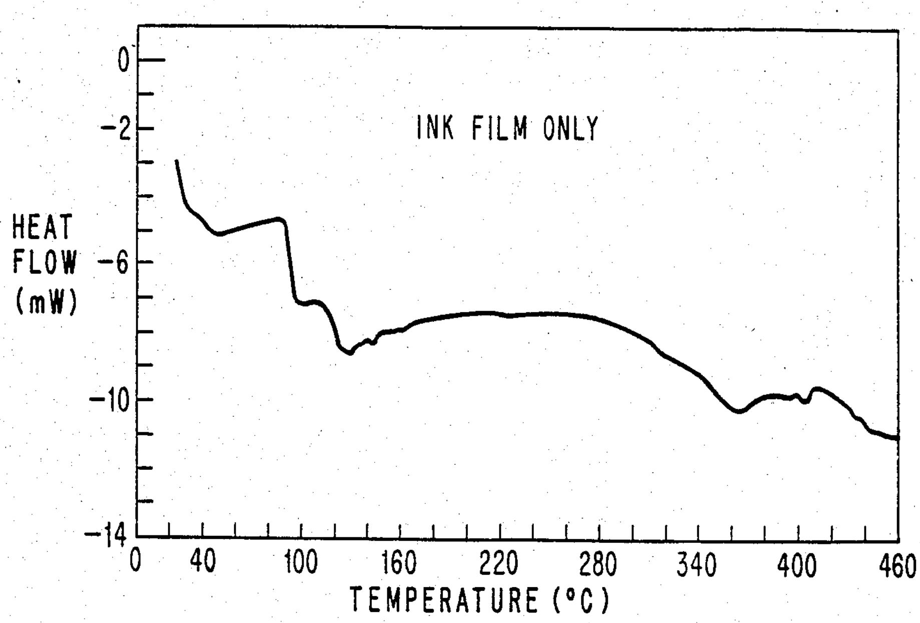
FIG. 4 is a graph of a representative ink, showing its heat flow characteristics as a function of temperature.

In the practice of this invention, improved chemical heat amplification is provided in any type of thermal transfer printing, in order to reduce the amount of applied energy which is required to effect ink melting and transfer. The chemical amplification is provided by an exothermic material which can be added to the ink formulation, or can be located in a separate layer. Also, the exothermic material can be located in the substrate of the ink-carrying ribbon, though this is not preferrable, since it would cause a large heat build-up in the support layer and possibly adverse fumes. If the exothermic material is located in a separate layer, it is generally supported by a binder, such as polyketone. Any polymeric binder that would form a film and easily adhere to other layers in the ink-bearing ribbon would be suitable.

The exothermic material providing chemical heat amplification is a material which will undergo an exothermic chemical action when heat is applied to it. The chemical heat amplification occurs only when external energy is applied to the ink in order to melt it. This externally applied heat can be from a thermal printhead, from current flow through a resistive layer on the ink bearing ribbon, or from heat produced by a laser printhead. The exothermic chemical action produces heat locally which is transferred to the ink in order to assist heating it to a temperature where its viscosity is correct for transfer to the receiving medium.

In general, the exothermic material used to provide heat amplification is chosen to be a material which is stable at room temperature, and which is non-volatile. It also should have a long lifetime (in excess of 100 years) at room temperature. It should be chemically transferred or decomposed at temperatures greater than about 100° C., but typically less than 200° C. That is, it must decompose or change with heat evolution within the operating range of temperatures of the ink chosen for use. In this regard, the viscosity of the ink is a key parameter, since the viscosity must be sufficiently low at a set temperature to enable ink flow to the receiving medium.

Another criterion for choosing the exothermic heat amplification agent is the amount of heat provided when the material undergoes chemical transformation or decomposition. Generally, in excess of 200 J/gr is preferable, since it is desirable to have about 50% of the required energy for ink transfer be provided by the exothermic reaction. The exothermic material must also be non-toxic, and its decomposition products must be non-toxic. It is suitable if the decomposition products are volatile if the volatile products are not hazardous. For example, gases such as nitrogen and carbon dioxide are ideal volatile by-products of the decomposition.

Still further, it is necessary that the decomposition products of the exothermic reaction not interfere with the rheological properties of the thermal printing system, such as the flow properties and printing quality provided by the ink.

It is generally desirable that the exothermic material be a single component material, since this provides more reliability in a practical system. For example, if two-component melting materials were used, the process would have to be such that the proper components would be adjacent to one another in order to provide the necessary exothermic chemical reaction. Also, the use of this exothermic material is limited to thermal transfer printing where the ink is melted for immediate transfer to the receiving medium. The exothermic material is not used in systems where the ink is melted a significant time prior to actual printing.

In a typical example, the exothermic material is in the solid ink layer in amounts of about 10–15 weight percent of the dry ink material. While this percentage range is usually preferred and typical, an extended range of 5–20 weight percent of the dry ink material has been found to be satisfactory. The amount of the exothermic material is calculated based on the operating temperatures of the ink and on the normal power requirements for the system that is chosen. Generally, it is not favorable to have an extremely large amount of chemical heat amplification, since the heat locally produced by the chemical reaction would then be sufficient to cause further chemical reactions which would spread like a fuse along the ink-bearing ribbon. This would completely eliminate local ink transfer. A reduction of applied power of about 50% is usually appropriate, although smaller reductions can still represent good energy savings. The exothermic material usually undergoes a decomposition reaction which yields heat and other by-products when a threshold temperature is reached. Thus, if the exothermic material M yields by-products X, Y and heat, the exothermic chemical reaction can be written as follows:

$$M \xrightarrow[> \text{threshold.}]{} X + Y + \text{heat}$$

The by-products X, Y should be non-toxic and not create adverse fumes or in any way adversely affect the printing qualities of the ink. The heat which is produced by the exothermic reaction adds to the applied energy and generally is produced after the melting point of the ink is reached. Exothermic materials which decompose at lower temperatures and are otherwise suitable, are generally not available. However, since there is a fairly wide temperature difference between an ink's melting temperature and the temperature at which it flows to the receiving medium, many exothermic materials can be used. For most known inks, it is sufficient if the exothermic reaction occurs between about 100° C. and 200° C.

As stated previously, it is preferable that the exothermic material M be a single component, rather than a combination of components which would have to be carefully combined in a printing ribbon in order to trigger the exothermic reaction.

In the practice of this invention, hydrazone derivatives which are either commercially available or easily synthesized by well known reactions provide heat amplification within the temperature ranges used for most inks. These materials include those having a hydrazone moiety as an essential structural feature, and certain carbonyl analogues. These compounds can be incorporated into the ink formulation prior to coating the ink on the ribbon, or can be located in a separate layer, or possibly even in the support layer of the ribbon. They provide energy for melting the ink and for enabling the ink to reach an optimal viscosity necessary for its effective transfer to plain paper. These materials undergo thermally induced chemical changes between 150°-180° C., accompanied by an exothermic reaction having a magnitude of the order of 0.4-0.5 kjoules/gram.

Figure 5:
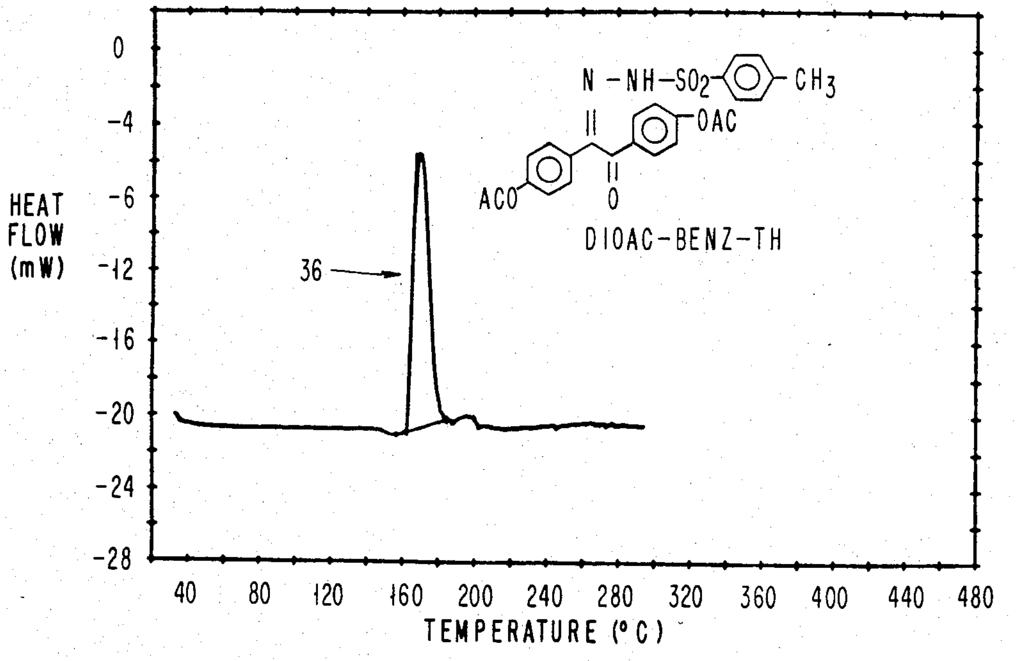
FIG. 5 is a heat flow versus temperature graph of a suitable exothermic additive, Benz-TH, which illustrates the heat available for chemical heat amplification.
Figure 6:
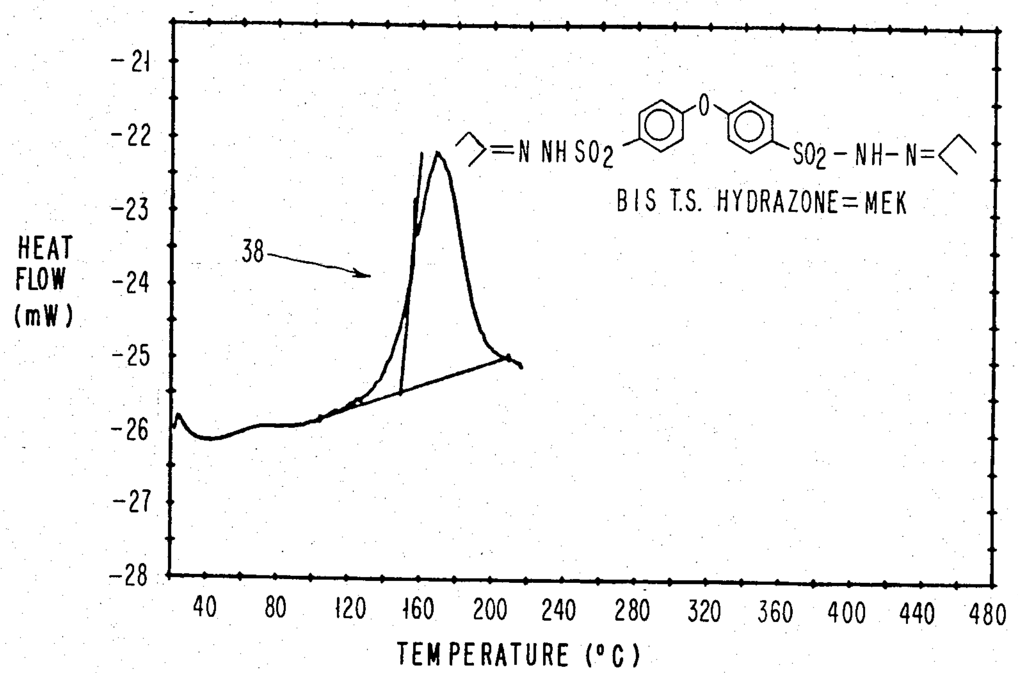
FIG. 6 is a heat flow versus temperature graph of another exothermic additive suitable for use in the present invention, this additive being BIS T.S. Hydrazone-MEK.
Figure 7:
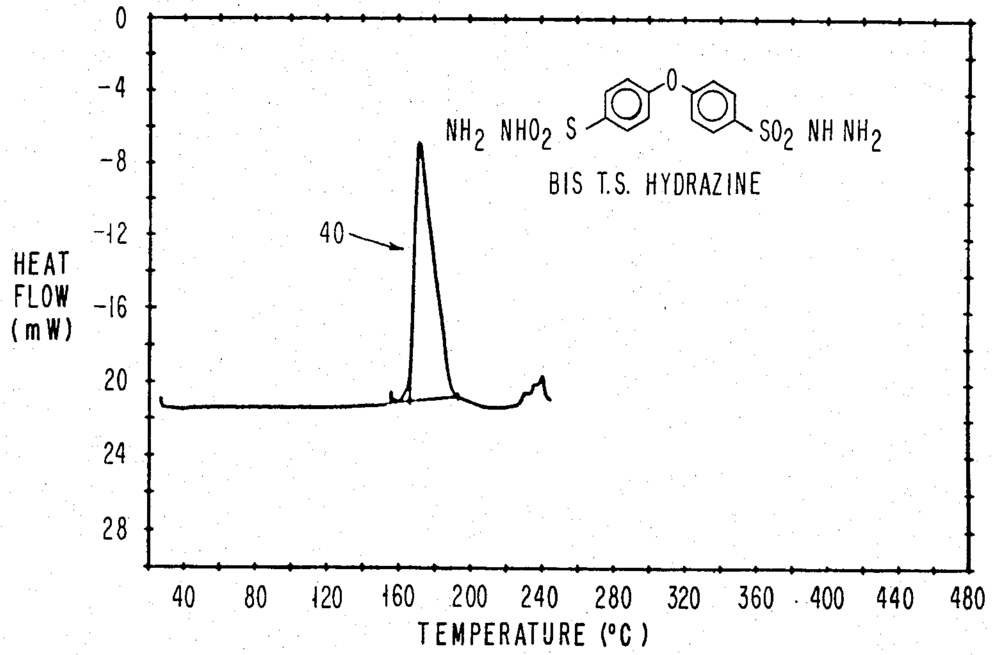
FIG. 7 is a heat flow versus temperature graph for another exothermic material this graph being for BIS T.S. Hydrazine. This material is not a practical choice, because it is quite insoluble in many solvents and inks.

These materials are chemically inert and are compatible with a wide variety of ink compositions, and especially organic based inks. Using thermogravimetric analysis (TGA) and differential scanning calorimetry (DSC), it has been demonstrated for the first time that these hydrazones undergo rapid thermally induced exothermic decomposition within a narrow range of temperature. Typical thermograms for these materials are shown in FIGS. 5, 6, and 7. These compounds can be synthesized from commercially available materials, as will be explained.

The following are the preferred hydrazone derivatives represented by the general formulas I-IV:

I. SUBSTITUTED ARYL SULFONYL HYDRAZONES

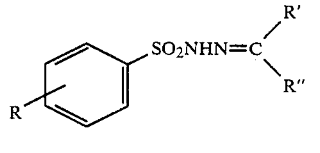

$R = CH_3, C_2H_5, C_3H_7, NO_2, C_6H_5$ $R' = CH_3, C_6H_5CO, CH_3COOC_6H_4CO, t\text{-}ButO\overset{O}{\overset{\|}{C}}OC_6H_4CO$ $R'' = CH_3, C_6H_5, CH_3COOC_6H_4, t\text{-}ButO\overset{O}{\overset{\|}{C}}OC_6H_4$

II. MONOHYDRAZONES OF ACYCLIC α-DIKETONES

-continued

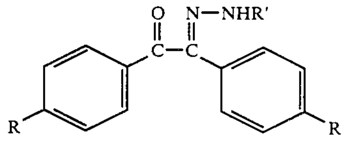

$R = Alkyl, OCOCH_3, O-\underset{\underset{O}{\|}}{C}-O-C(CH_3)_3$ $R' = H, SO_2C_6H_5, SO_2C_6H_4CH_3, COC_6H_5$

III. AROMATIC DISULFONYL AND DIACYL HYDRAZONES

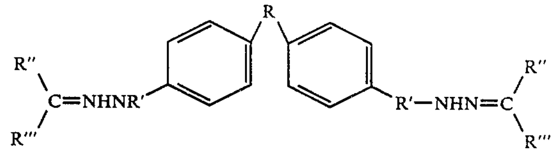

$R = O, CH_2, SO_2$
$R' = CO, SO_2$
$R'', R''' = CH_3, C_6H_5, C_2H_5$

IV. MONO-HYDRAZONES OF CYCLIC α-DICARBONYL HETEROCYCLES

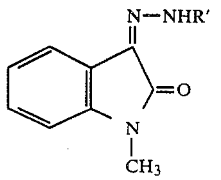
(a)

$R' = H, SO_2C_6H_5, COC_6H_5, SO_2C_6H_4CH_3$.

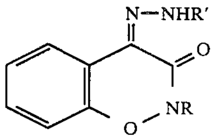
(b)

R' = same as in (a)
R = H, Alkyl, Phenyl, subsitituted Phenyl

In the hydrazone derivatives II-IV, R can be in other positions on the benzene ring than that noted, and there can be more than one R group on the ring. Also, other groups, such as R', can also be included on the ring (alone, or with an R group).

In the practice of this invention the hydrazone derivatives which are suitable additives are those having a molecular weight greater than about 150 and less than about 650. If the molecular weight is too low, then phase separation of polymers can occur and shelf life and thermal stability will be adversely affected. Also, the likelihood for the formation of volatile byproducts will increase. If the molecular weight is too high, it is difficult to obtain uniform mixtures having good coating characteristics, due to the increased likelihood of phase incompatibility.

These representative systems have been used as additives to inks in, for example, resistive ribbon thermal transfer printing, in amounts typically 10% of the total ink solids, by weight. Their use has provided considerable improvement in print quality as compared to results with undoped inks in both thermal printing and in resistive ribbon thermal transfer printing. Additionally, it has been found that some of the intermediate sulfonyl hydrazines may also be employed as additives, but they are less attractive candidates than the corresponding hydrazones. This is because of their low soluability and chemical reactivity. All of these materials are colorless, have no shelf life problem, and have good light stability.

Mass spectra analysis of these hydrazones, such as benzil tosylhydrazones, indicates that these compounds undergo exothermic decomposition through the formation of the corresponding d-diazoketones which then fragment (exothermally) to molecular nitrogen and carbene that rearranges to a ketene intermediate, as represented by the following example:

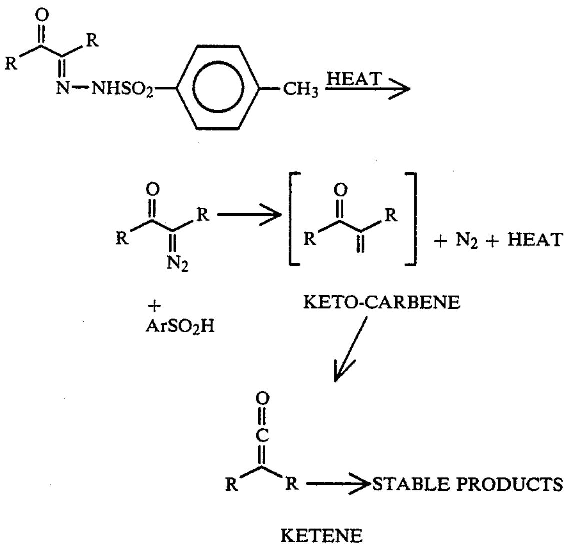

Mass spectral analysis of the hydrazones derived from p, p'-oxybis (benzene-sulfonylhydrazide) and ethyl methyl ketone shows that at the source temperature corresponding to its exotherm temperature (170°-180° C.), a major peak at a mass/charge ratio m/e=56 for $CH_3CH_2C—CH_3$ is observed, in addition to the peak observed at m/e=28 for nitrogen.

SYNTHESIS OF HYDRAZONE DERIVATIVES

The hydrazone derivatives of this invention are either commercially available, or can be easily synthesized by well known reactions.

The following will present some examples of procedures that can be used to synthesize these materials:

p-toluene-sulfonyl hydrazones

This procedure also applies to sulfonyl derivatives of hydrazones and ketones. It is as follows:

To a solution of 1 part by weight of carbonyl group equivalent of the precursor in 20–30 parts of absolute methanol or ethanol is added, with constant stirring, a solution of p-toluene sulfonyl hydrazine in the alcoholic solvent. Upon further stirring at ambient or slightly elevated temperature (40°–60° C.) the tosylhydrazine product begins to precipitate out. The reaction mixture is stored for some more time to allow completion of the reaction, after which the solid is collected by filtration, washed with alcohol to remove any unreacted starting material, and dried under vacuum.

For high purity, the material is crystallized from alcohol or alternate solvents prior to use.

Reference—"Reagents in Organic Synthesis", Vol. 1, 1967, pp. 1185–1187, Mary Fieser and Louis Fieser Wiley-Interscience 4,4' Di-t-Butoxycarbonyloxybenzil The procedure for the preparation of t-Butoxycarbonyloxy (t-Boc) derivative of 4,4'-dihydroxybenzil is as follows:

To a solution of 4,4'-dihydroxybenzil (2.4 g, 10 m.mole) in methanol (15 ml) was added sodium hydroxide (0.8 g, 20 m.mole). To the magnetically stirred mixture was added di-t-butyl dicarbonate* (3.5 g, 20 m.mole). After stirring for 12 hours at ambient temperature the solvent was removed under reduced pressure. The residue was treated with ice-water (approximately 50 g) and the product extracted with three 25 ml portions of $CH_2Cl_2$. The organic extract was washed with dilute ice-cold NaOH solution, then with brine and dried over anhydrous magnesium sulfate. Removal of the solvent under reduced pressure gave white crystalline solid after crystallization from pentane at low temperature yielded 3.5 gm of crystalline product (melting point (mp)=82°–83°).

* Available from Aldrich Chemicals and from Fluka Reference for its general use: "Reagents in Organic Synthesis", Vol. 4, 1974, p. 128, by Mary Fieser and Louis Fieser, Wiley-Interscience Monotosylhydrazones of 4,4'-disubstituted Benzil derivatives as represented by the general formula II, above.

These previously unknown materials are synthesized by the general procedure illustrated by the following two examples:

A. 4,4'-Diacetoxybenzil Mono Tosylhydrazone:—II, $R=OCOCH_3$, $R'$- $SO_2C_6H_4CH_3$(p) A mixture of 4,4'-diacetoxybenzil (6.52 g, 20 m.mole) and p-toluene sulfonyl hydrazine (3.7 g, 20 m.mole) in 50 ml of dry ethanol was heated at 60°–65° for 30 minutes when a light pale solid separated. After keeping at ambient temperature for an hour, the mixture was cooled to 10° C. in ice-water bath. The precipitate was filtered under suction and washed with ice-cold ethanol to give 7.5 g of the monotosyl hydrazone (mp 170°–171°). After one crystallization from dilute ethanol it registered a mp of 172°–174°(dcc.)

Synthesis of Monotosylhydrazones of Cyclic α-diketones is described by M. P. Cava, R. L. Litle and D. R. Napier, J. Am. Chem. Soc., 80, 2257–2263 (1958).

B. 4,4'-Di-t-Butyloxycarbonyl Benzil Monotosylhydrazone:—II,

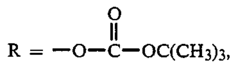

$R'=SO_2C_6H_4CH_3$(p) To a solution of di-t-butoxycarbonyloxybenzil (1.78 g, 4 m.mole) in methanol (20 ml) was added p-toluenesulfonylhydrazine (0.75 g, 4 m.mole) followed by a drop of concentrated HCl and a trace of p-toluenesulfonic acid. The mixture was warmed to 40°–45° C. and set aside for 24 hr. at room temperature during which time a white solid separated out. The solvent was removed under vacuum and the solid was washed with cold methanol-petroleum ether mixture and finally crystallized from methanol to give 1.5 g of the desired product as a white solid (mp 128°–129° C.).

Applications to Thermal Transfer Printing

(FIGS. 1.1, 1.2, 2 and 3)

These figures illustrate different types of ink bearing ribbons and different types of thermal transfer printing. As explained previously, the use of chemical heat amplification is applicable to any type of thermal transfer printing where the ink is melted at the time it is to be transferred to the receiving medium. Chemical heat amplification is used to assist in bringing the ink viscosity to the proper level for transfer to the receiving medium.

In FIG. 1.1, the ink bearing ribbon 10 is located adjacent to the receiving medium 12, and includes a support layer 14, an ink bearing layer 16, a conductive material 18, and a resistive material 20. This type of ribbon is often used in resistive ribbon transfer printing of the type described previously. In this embodiment, the chemical heat amplification agent is an additive in ink layer 16. The nature of the various layers in ribbon 10 and their thicknesses are well known in the art. For example, the resistive layer 20 can be comprised of graphite dispersed in a binder, as is well known, or can be comprised of an inorganic resistive material, preferably a binary alloy, of the type taught in copending U.S. application Ser. No. 356,657, filed Mar. 10, 1982 and assigned to the present assignee. The support layer 14 can be comprised of mylar while the conductive layer 18 can be comprised of aluminum. When aluminum is used for the conductive layer, a metal silicide resistive layer is often used.

Of course, the conductive layer 18 can be absent, so that the resistive layer 20 is applied directly to the support layer 14. Also, the resistive layer can be thick enough to provide support for the ribbon, so that support layer 14 will not be needed.

In the use of this ink-bearing ribbon, power is supplied to a stylus brought into electrical contact with resistive layer 20. The resistive layer is also in contact with a ground electrode. When the thin wire stylus is applied to those regions of the ribbon opposite the areas of the receiving medium 12 to which ink is to be transferred, the fusible ink layer will locally melt due to localized resistive heating. At the same time, the exothermic reaction in the ink will produce heat, aiding in the heating and transfer process by which the ink is transferred from the layer 16 to the receiving medium 12.

Any type of ribbon, such as those used in the prior art, can be utilized in the practice of this invention. The following will therefore provide only a representative description of the various layers comprising these ribbons.

Support layer 14 is generally comprised of an electrically nonconductive material which is flexible enough to allow the formation of spools or other "wrapped" packages for storing and shipping. It is capable of supporting the remaining layers of the ribbon and is comprised of a material which does not significantly impede the transfer of thermal energy from the resistive layer 20 on one side of the support layer to the fusible ink layer 16 on the other side, in order to increase the efficiency of printing. Of course, in the practice of this invention, this problem is minimized because of the chemical heat amplification. Although many materials may be employed as the support layer, the preferred material has often been mylar polyester film. Other suitable materials include polyethylene, polysulphones, polypropylene, polycarbonate, polyvinylidene fluoride, polyvinylidene chloride, polyvinyl chloride, and Kapton (a trademark of E. I. Dupont deNemours).

The thicknesses of the support layer and the other layers of ribbon 10 are controlled to some degree by the required transfer of thermal energy and the ability to store the ribbon material, as well as by the machinery in which the ribbon is used (for example, a computer terminal or typewriter). The support layer is often about 2–5 micrometers in thickness.

In the practice of this invention, any type of ink composition can be used, the inks generally being comprised of a low melting point polymer binder and a colorant. The ink composition of layer 16 is not flowable at room temperature, but becomes flowable and transferrable upon heating. This causes a transfer of ink from the ribbon 10 to the paper or other receiving medium during the printing process. A representative ink contains a polyamide and carbon black. A particular composition used as an example is versamide/carbon black mixture, which melts at approximately 90° C. This ink composition and many others are disclosed in U.S. Pat. No. 4,268,368.

In practice, the fusible ink layer 16 may be 4–6 micrometers in thickness. As noted previously, when the chemical amplification agent is located in the ink layer, it is typically present in an amount 10–15 atomic weight percent of the dry ink material. An extended range in which the invention may be practiced is 5–20 weight percent of the dry ink material.

In providing an ink formulation including the exothermic material, another typical example is a solution of 20 g Versamid 950 (produced by General Mills, Inc.) and carbon black (special black 4), plus isopropanol. The carbon black is present in an amount about 2% of the polymer, or 0.5 g. Eighty ml of isopropanol is also used. In this ink formulation the amount of chemical additive is about 2 g. The ribbon is coated to a thickness of about 5 micrometers (dry thickness, i.e. after the solvent dries).

The support layer 14 may be coated with the fusible ink composition 16 by any of a number of well known coating methods, such as roll or spray coating.

In ribbon 10, the thin metallic layer 18 is typically 50–200 nm in thickness, a preferred thickness being approximately 100 nm. This layer must be thin since it tends to spread the heat produced by the current flow. In some ribbons, the conductive layer is a stainless steel strip, which also acts as the support layer. In other ribbons, the conductive layer 18 is omitted, and current flows only through the resistive layer. In this latter type of ribbon, heat is produced under the printing stylus by the current crowding which occurs there.

Resistive layer 20 is either applied to a free surface of support layer 14, or to the surface of metallic layer 18, as in FIG. 1.1. The resistive material can be any of those used in conventional resistive ribbon transfer printing, or the inorganic binary alloys described in aforementioned copending application Ser. No. 356,657. Suitable binary alloys include the off-stoichiometric metal silicides having the general formula $M_{1-x}\ Si_x$. Alloys of two metallic elements may also be used. Generally, any number of elements of groups III and IV of the Periodic Table may be paired with a metal in the inorganic resistive layer. These resistive materials need not be supported in a polymeric binder. This has advantages, including the prevention of toxic fumes which may be released from such binders. The metals employed in the resistive layer are chosen to be those which will not explosively, harmfully, or otherwise chemically react upon resistive heating. Metals such as nickel, cobalt, chromium, titanium, tungsten, molybdenum and copper are suitable.

The composition of the metal silicide may vary widely, and is generally selected on the basis of its resistivity. A restitivity of approximately 100–500 ohm-centimeters is preferred. Various compositional ranges are described in this copending application. Typically the thickness of the resistive layer is from about 0.5 micrometers to about 2 micrometers. The resistive layer is applied to the ribbon by well known techniques including vacuum evaporation and sputtering. Constant voltage power sources are preferred when binary alloys of silicon are used as the resistive material.

FIG. 1.2 shows another ribbon 22, which is similar to ribbon 10 in FIG. 1.1, except that the exothermic material is located in a separate layer 24, rather than in the ink layer. Since the ribbons are otherwise similar, the same reference numerals will be used to describe functionally equivalent layers in ribbons 10 and 22. The receiving medium is still designated 12. Therefore, ribbon 22 is comprised of a support layer 14, an ink bearing layer 16, a thin conductive layer 18, a resistive layer 20, and a layer 24 including the exothermic material used to provide chemical heat amplification. Layer 24 is located close to layer 16 in order to have the heat produced by the exothermic reaction easily transferred to the ink layer.

Layer 24 is typically comprised of a binder having the exothermic material therein. An example of such a binder is polyketone. This and many other types of binders can be used, the binder generally being a polymeric material which can be formed in a film and which easily adheres to support layer 14. The qualities used to select the support layer can also be used to select the binder of layer 24.

When the exothermic material is located in a separate layer, it is generally preferred to make the layer as thin as possible, since each layer of the ribbon adds to the total thermal mass, and means that extra heat must be required for printing. Therefore, layer 24 has a maximum thickness of about 10,000 Å. The additive in layer 24 is more concentrated than it is when it is in the ink layer, and is typically four or five times more concentrated. Thus, it is preferrably about 40–50% of the total solid weight of layer 24.

The foregoing explanations with respect to representative materials, thicknesses, and other properties of the various layers of the ribbon 10 also apply to ribbon 22, and to the other ribbons shown in FIGS. 2 and 3.

FIG. 2 represents an ink transfer ribbon 26 including a support layer 28 and an ink-bearing layer 30. The improved chemical heat amplification additive is present in the ink layer 30.

The ribbon 26 of FIG. 2 is used in printing of the type where a thermal head 32 provides energy for melting the ink and transferring it to the receiving medium 12. Thus, the onset of energy from thermal head 32 causes an exothermic reaction in the ink layer 30, where this exothermic reaction aids melting and transfer of the ink to the receiving medium 12. In this embodiment, the amount of exothermic material located in the ink formulation is the same as that described previously.

FIG. 3 shows another type of thermal transfer printing using the same type of ribbon as that in FIG. 2. The only difference is that the thermal head is now a laser array 34. For this reason, the same reference numerals are used for ribbon 26, including support 28 and ink-bearing layer 30.

Representative Thermographs (FIGS. 5–7)

These FIGS. show the thermographs for three different chemical additives in accordance with the present invention. The sharply defined exothermic reaction of each of these additives is illustrative from these thermographs, which were prepared by differential scan calorimetry (DSC), they show heat flow into and out of the additive, as a function of temperature.

In FIG. 5, a hydrazone, specifically, 4,4′-diacetoxybenzilmonotosylhydrazone, yields an exotherm maximum at about 170° C. The heat release in the exothermal spike 36 is 0.32 kJ/gm.

FIG. 6 is a thermograph for the bis-tosyl hydrazone prepared by the reaction of methylethylketone (MEK) with p,p′-oxybis (benzene sulfonylhydrazine) which exhibits an exotherm maximum at about 168° C. For this material, the heat released is about 0.47 kJ/gm. In contrast with the material in FIG. 5, Bis T.S.-hydrazone-MEK does exhibit some exothermicity prior to its exothermic peak 38.

FIG. 7 is a thermograph of the hydrazine Bis T.S. hydrazine, specifically p,p′-oxy BIS-(Benzene-Sulfonyl-Hydrazine), which is commercially available. This material has an exothermic maximum, indicated by the spike 40, where the released heat is about 0.96 kJ/gm. The exotherm maximum occurs at about 172° C. for this material. Although this material has high exothermicity, it is not very soluble in common solvents and in most inks. For this reason, it is not a practical choice as an additive.

While many commercially available inks exhibit melting at a temperature of about 90° C., their viscosity upon melting may still be too high to cause transfer to the receiving medium. In many cases, these inks must be heated further, for example, to 170°–190° C. Thus, the exothermic reaction does not have to occur at the melting point (although that would be advantageous) and can occur at higher temperatures. Depending upon on the preferred operating range of the ink, there is substantial leeway in choosing the exothermic material. The exothermic reaction should occur within the operative temperature range of the ink, whatever that may be and, in the case of presently available inks, is within the range of about 80°–200° C.

A control thermal transfer ink composition is formed by blending 0.2 parts by weight of Carbon Black (XC-72R, Cabot) 2 parts of "versamide" 940 having a melting point of 100°–120° C. and 18 wt. parts of isopropanol. To this control ink was formulated 10 wt. percent (based on total ink solids) of 4,4′-diacetoxybenzil monotosylhydrazone to obtain an improved ink composition according to this invention.

A three layer recording sheet for thermal ink transfer printing using the ink layer composition described above was fabricated as follows:

On the surface of an electric resistive film having 10–20 micrometers thickness and comprising high conductivity Carbon Black and polycarbonate in a weight ratio of 1:10, is deposited a conductive film of Al by sputtering or vacuum evaporation to a thickness of 2–5 micrometers, followed by application of the ink layer in a conventional web coating process and solvent evaporation to form a 4–7 micrometers thick dry ink film.

In printing experiments, the three layer recording thus prepared is placed in contact with a plain paper and a current is passed through the recording electrode in contact with the electric resistant layer. Similar printing experiments using the control ink layer (without the additive) showed that the ink transfer in the case of the modified sheet can be achieved at less than half the input energy that is required for the control sheet, for the same quality of printing.

In the practice of this invention, heat amplification is used to reduce the magnitude of the applied input power in thermal transfer printing, and for minimizing the problems which occur when the applied input power has to be increased. The improved chemical additives can be placed either in the ink formulation, in a separate layer on the ribbon or, less preferrably, in the support layer of the ribbon. The exothermic materials of the present invention provide heat in the useful temperature range of operation of the ink, and exhibit good shelf life, stability against shock, and colorless appearance. Choosing an exothermic material that provides heat in the useful temperature range of operation of the ink means that greater temperatures are achieved then would be achieved by the input power alone, and the characters so produced are sharper and have less voids. Typically, 40–50% of the necessary heat energy can be provided by the exothermic reaction, although any percentage gain is within the scope of this invention. Also, while ribbons are shown for carrying the ink-bearing layer, the term "ribbon" is meant to include any type of structure for carrying an ink-bearing layer.

While the invention has been described with respect to particular embodiments thereof, it will be appreciated by those of skill in the art that variations in the equipment utilizing the described chemical additives can be made without departing from the form and spirit of the invention, which is characterized by the use of these new materials in the broad field of thermal transfer printing.

Having thus described our invention, what we claim as new and desire to secure by Letters Patent is:

1. In thermal transfer printing an ink bearing ribbon comprising a support layer and at least one other layer, said one other layer including a fusible ink which is solid at room temperature and which includes a low melting point polymer binder and a suitable colorant, and an exothermic heat amplification material, said material giving off heat to said ink when its temperature is raised to at least a threshold amount, and being a hydrazone derivative having a molecular weight between about 150 and about 650.

2. The ribbon of claim 1, where said exothermic material is substantially colorless and undergoes an exothermic reaction at temperatures between about 100° C. and 200° C. to release at least about 200 J/gram.

3. The ribbon of claim 2, where said exothermic material is located in said fusible ink layer in an amount 5–20 weight percent of dry ink.

4. The ribbon of claim 2, where said exothermic material is located in a separate layer on said ribbon.

5. The ribbon of claim 2, where said exothermic material is located in said support layer.

6. The ribbon of claim 2, where said exothermic material is chosen from the group consisting of substituted aryl sulfonyl hydrazones, monohydrazones of acyclic α-diketones, aromatic disulfonyl and diacyl hydrazones, and monohydrazones of cyclic α-dicarbonyl heterocycles.

7. The ribbon of claim 6, where said substituted aryl sulfonyl hydrazones have the formula

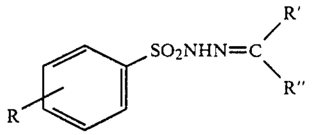

where $R=CH_3,C_2H_5,C_3H_7,NO_2,C_6H_5$ $R'=CH_3,C_6H_5CO,CH_3COOC_6H_4CO,$

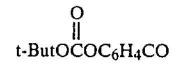

$R''=CH_3,C_6H_5,CH_3COOC_6H_4,$

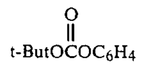

8. The ribbon of claim 6, where said mono hydrazones of acyclic α-diketones have the formula

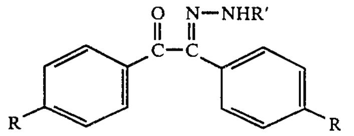

where

R=aklyl, $OCOCH_3$,

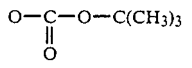

$R'=H$, $SO_2C_6H_5$, $SO_2C_6H_4CH_3$, $COC_6H_5$, the position of said R group on said rings being non-critical.

9. The ribbon of claim 2, where said aromatic disulfonyl and diacyl hydrazones have the formula

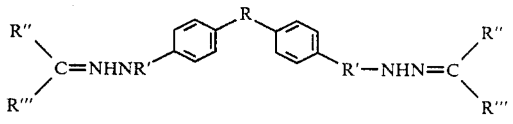

where $R=O$, $CH_2$, $SO_2$ $R'=CO$, $SO_2$ $R''$, $R'''=CH_3$, $C_6H_5$, $C_2H_5$, the position of said R and R' groups on said rings being non-critical.

10. The ribbon of claim 2, where said monohydrazones of cyclic α-diacarbobyl hetero cycles have the formulae

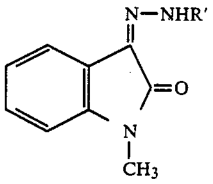

(a)

where

R'=H, $SO_2C_6H_5$, $COC_6H_5$, $SO_2C_6H_4CH_3$

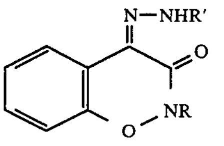

(b)

where where R'=H, $SO_2C_6H_5$, $COC_6H_5$, $SO_2C_6H_4CH_3$

R=H, alkyl, Phenyl, substituted phenyl, the position of said R group on said rings being non-critical.

11. In a thermal transfer printing process wherein energy is applied to an ink-bearing ribbon to melt and transfer said ink to a receiving medium for printing thereon, the improvement wherein some of the heat required for said printing is provided by an exothermic chemical reaction of a chemical substance in said ribbon, said chemical substance being a substantially colorless hydrazone derivative having a molecular weight between about 150 and about 650.

12. The method of claim 11, wherein said exothermic reaction is produced locally, and occurs within the operative temperature range of said ink.

13. The method of claim 12, wherein said exothermic reaction occurs at temperatures greater than about 100° C. and less than about 200° C.

14. The method of claim 13, where said exothermic reaction provides heat in excess of approximately 200 J/gram of said chemical substance.

15. The method of claim 14, where said exothermic reaction is provided by the decomposition of said chemical substance, said substance being stable at room temperature and decomposing at temperatures between approximately 100° C. and 200° C.

16. A method for thermal transfer printing, comprising the steps of:

bringing a ribbon containing a fusible ink which is solid at room temperature and a receiving medium into contact with one another, applying heat energy to a localized area of said ink to increase the temperature of said ink in said localized area, said heat energy being an amount sufficient to trigger an exothermic reaction in said ribbon, and chemically amplifying the amount of heat in said localized area by said exothermic reaction, the total amount of heat energy delivered to said localized area by said application of heat energy and said exothermic reaction being sufficient to cause melting of said ink and transfer of said melted ink to said receiving medium, where said exothermic reaction is produced by the decomposition of an exothermic material in said ribbon upon the application of said heat energy, said exothermic material being a substantially colorless hydrazone derivative having a molecular weight between about 150 and 650, and which undergoes thermally induced chemical changes between about 150°-180° celcius.

17. The method of claim 16, where said heat energy is applied from a heat-producing thermal head brought into contact with said ribbon.

18. The method of claim 16, where said heat energy is applied from a laser printhead which directs photons to said ribbon.

19. The method of claim 16, where said heat energy is supplied by the passage of electrical current through a resistive layer in said ribbon.

20. The method of claim 16, where the amount of exothermic material in said ink-bearing layer is in the range 5-20 weight percent of dry ink material.

21. The method of claim 20, where said exothermic material produces heat in excess of 200 J/gram of said material during said exothermic reaction.

22. The method of claim 16, where said exothermic material is selected from the group consisting of substituted aryl sulfonyl hydrazones, mono hydrazones of acylic α-diketones, aromatic disulfonyl and diacyl hydrazones, and mono hydrazones of cyclic α-dicarbonyl heterocycles.

* * * * *